United States Patent [19]
Momose

[11] Patent Number: 6,040,038
[45] Date of Patent: Mar. 21, 2000

[54] FILM CONDENSER AND METALIZED FILM

[75] Inventor: Mitsuru Momose, Aizuwakamatsu, Japan

[73] Assignee: Mitsubishi Shindoh Co., Ltd., Tokyo, Japan

[21] Appl. No.: 08/972,994

[22] Filed: Nov. 19, 1997

[30] Foreign Application Priority Data

Nov. 22, 1996 [JP] Japan ................................. 8-312356
Nov. 22, 1996 [JP] Japan ................................. 8-312357
Nov. 22, 1996 [JP] Japan ................................. 8-312361

[51] Int. Cl.$^7$ ................................. B32B 9/00; H01G 4/06
[52] U.S. Cl. ................. 428/209; 361/303; 361/306.1; 361/311; 361/275.3; 361/275.4; 428/901
[58] Field of Search ................. 361/301.4, 306.2, 361/306.3, 309, 323, 328, 311–313, 303, 321.1–321.5; 428/209

[56] References Cited

U.S. PATENT DOCUMENTS

| H416 | 1/1988 | Colvin ..................................... 361/398 |
| 2,216,558 | 10/1940 | Ortlieb . |
| 4,430,688 | 2/1984 | Tamura et al. .......................... 361/307 |
| 5,136,462 | 8/1992 | Steiner .................................... 361/273 |
| 5,430,605 | 7/1995 | DeNeuf et al. ....................... 361/321.1 |
| 5,495,387 | 2/1996 | Mandai et al. .......................... 361/328 |
| 5,615,078 | 3/1997 | Judis et al. .............................. 361/313 |

FOREIGN PATENT DOCUMENTS

| 867888 | 7/1949 | Germany . |
| 08312356A | 11/1996 | Japan . |
| 08312357A | 11/1996 | Japan . |
| 08312361A | 11/1996 | Japan . |

*Primary Examiner*—Deborah Jones
*Assistant Examiner*—Cathy F. Lam
*Attorney, Agent, or Firm*—Pearne, Gordon, McCoy & Granger LLP

[57] ABSTRACT

The present invention relates to a film condenser and a metalized film for manufacturing the same. The metalized film comprises a base film formed from an insulating material, and a metal coating layer formed on the base film. A plurality of uncoated portions are formed as area partition margins in the metal coating layer so as to respectively form, in the metal coating layer, a plurality of electrode regions, a plurality of fuse connecting regions surrounded by two or more of the electrode regions, and a plurality of fuse portions. The fuse portions electrically connect each one of the fuse connecting regions with the electrode regions surrounding the one of the fuse connecting regions.

13 Claims, 14 Drawing Sheets

FILM CONDENSER AND METALIZED FILM

BACKGROUND OF THE INVENTION

1. Field of the Invention

The present invention relates to film condensers and metalized films for manufacturing the film condensers.

This application is based on Japanese Patent Application Nos. Hei 8-312356, Hei 8-312357, and Hei 8-312361, the contents of which are incorporated herein by reference.

2. Related Art

Film condensers are generally manufactured by preparing first and second plastic films on which a thin metal layer is deposited, placing the second film on the first film, rolling up the stacked films so as to form a cylindrical body, and forming a pair of terminal electrodes at both ends of the cylindrical body by thermal spraying.

Recently, for the purpose of improving safety, film condensers having a fuse function have been put to practical use. In such a film condenser with a fuse function, a plurality of uncoated portions are formed in a metal coating layer of at least one of the two metalized films so that the metal coating layer is divided into a plurality of rectangular electrode regions and narrow fuse portions electrically connecting each electrode region to one of the terminal electrodes. According to the film condensers of this type, should a short circuit occur between the electrode regions of the first and second metalized films, the fuse portion will instantly evaporate due to the heavy current passing therethrough, the supplement of the current to the area including the short circuit point can thereby be stopped.

In this type of film condenser, because at least one electrode region becomes incapacitated whenever a short circuit occurs in the condenser, the capacitance of the condenser will be gradually decreased. Furthermore, the breaking down of the fuse portions is likely to be occurred for other reasons, for example, by a corona discharge generated between the metal layers of the first and second metalized films. Therefore, the decrease ratio of the capacitance in the film condenser having a fuse function is relatively large, and it is desired to reduce the capacitance decrement generated by each brake down of the fuse portion.

In order to achieve this object, Japanese Patent Application, First Publication, No. Hei 4-225508 discloses a film condenser in which the area of the electrode regions is reduced by arranging a plurality of rectangular electrode regions in a lattice pattern. Each of the four corners of each electrode regions is connected by a fuse portion to the adjacent three corners of other electrode regions. That is, each fuse portion simultaneously connects four electrode regions.

However, in a film condenser of this type, when one of the fuse portions breaks down due to a short circuit, the fuse portions locating adjacent to the cut fuse portion are likely to break down, as if it is a chain reaction, due to the electrical shock. Therefore, in spite of small area of the electrode regions, the decrease of the capacitance which occurs at every break downs of the fuse portion cannot be improved in comparison with the conventional one.

SUMMARY OF THE INVENTION

The objective of the present invention is to provide film condensers and metalized films having fuse functions in which the decrease of the capacitance can be reduced while obtaining appropriate fuse functions.

In order to achieve this objective, the metalized film according to the first aspect of the present invention comprises a base film formed from an insulating material, and a metal coating layer formed on the base film. A plurality of uncoated portions are formed as area partition margins in the metal coating layer so as to respectively form, in the metal coating layer, a plurality of electrode regions, a plurality of fuse connecting regions surrounded by two or more of the electrode regions, and a plurality of fuse portions electrically connecting each one of the fuse connecting regions with the electrode regions surrounding the one of the fuse connecting regions.

The film condenser according to the first aspect of the present invention comprises first and second metalized films which are stacked up to each other, and at least the first metalized film is the above-described metalized film. The first and second metalized films may be rolled together to form a rolled capacitor or may be alternately piled up to form a stacked capacitor. The metal coating layer of the first metalized film is connected to a first electrode terminal, and the metal coating layer of the second metalized film is connected to a second electrode terminal.

According to the first aspect of the present invention, because a plurality of the fuse portions connected to the electrode regions adjoining each other are connected to each other via the fuse connecting region having a predetermined area, it is possible to thermally isolate the neighboring fuse portions from each other. Therefore, when one of the fuse portions is cut due to the short circuit, it is possible to prevent the neighboring other fuse portions from breaking down due to the heat generating at the evaporated fuse portion, the decrease of capacitance of a film condenser can thereby be reduced while obtaining a proper fuse function.

In the metalized film and the film condenser according to the second aspect of the present invention, a plurality of uncoated portions are formed as area partition margins in the metal coating layer so as to respectively form, in the metal coating layer, a plurality of electrode regions and a plurality of fuse portions electrically connecting neighboring ones of the electrode regions. Selected ones of the fuse portions have a different width from that of the other of the fuse portions, that is, the selected ones of the fuse portions have a different fusing current from that of the other of the fuse portions.

According to the second aspect of the present invention, because selected ones of the fuse portions have a different fusing current from that of the other of the fuse portions, when a corona discharge occurs in one of the electrode regions, only the neighboring fuse portion(s) having a lower fusing current will be break down while the neighboring fuse portions having a higher fusing current remains uncut. Therefore, it is possible to reduce the unnecessary incapacitation of the electrode regions which may occur when a corona discharge occurs, it is thereby possible to restrain the decrease of the capacitance of the film condenser.

In the metalized film and the film condenser according to the third aspect of the present invention, a plurality of first uncoated portions are formed as electrode partition margins in said metal coating layer so as to respectively form, in said metal coating layer, a plurality of electrode regions and a plurality of first fuse portions electrically connecting neighboring ones of said electrode regions. Furthermore, a plurality of second uncoated portions are formed as terminal partition margins in said metal coating layer so as to respectively form, in said metal coating layer, terminal regions extending along an edge of said base film, and second fuse portions electrically connecting said terminal regions and said electrode regions.

According to the third aspect of the present invention, because the second fuse portions are formed to electrically connect said terminal regions and said electrode regions, it is possible to treat with short circuits which may occur near the terminal regions, the safety of the condenser can thereby be improved.

DETAILED DESCRIPTION OF THE PREFERRED EMBODIMENTS

Figure 1:
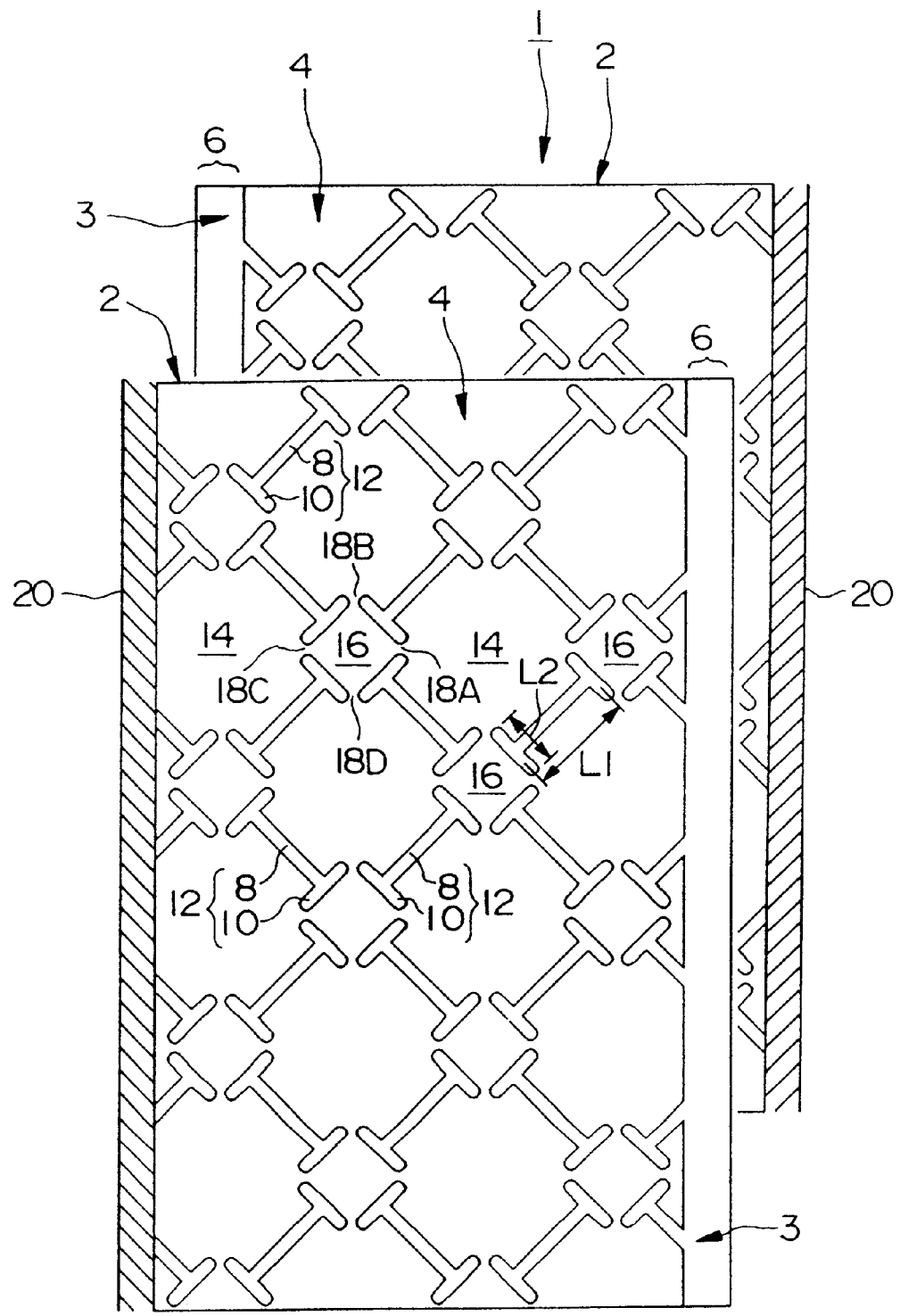
FIG. 1 is a development showing metalized films and a film condenser according to the first embodiment of the present invention.

Referring now to FIG. 1, there is shown an embodiment of the film condenser 1 and the metalized films 2 of the present invention. The film condenser 1 comprises first and second metalized films, a pair of the same films 2 in this case, and the films 2 are stacked up with each other and are rolled together to form a cylindrical body (not shown). A pair of terminal electrodes 20 are formed on both ends of the cylindrical body so as to be respectively coupled with one of metal coating layers 4 of the metalized films 2, by an appropriate method, for example, by metal spraying, and lead elements such as lead wires connected to the terminal electrodes 20 and a sheath for protecting the cylindrical body are respectively provided on the cylindrical body (not shown).

Although this embodiment utilizes a pair of the same films 2, it is also possible to use, as one of the metalized films, a metalized film which has the same width as that of the metalized film 2 but does not have area partition margins 12. Even in such a construction, the same effects as those of the embodiment shown in FIG. 1 can be obtained.

Furthermore, the present invention is not limited to the application for rolled capacitors such as those shown in FIG. 1, but can also be applied to stacked capacitors. In the case of forming stacked capacitors, the first and second metalized films 2 are cut to be a rectangular shape, and the rectangular films are alternatively stacked up to form a layered body.

The metalized film 2 comprises a plastic base film 3 having a constant width and a metal coating layer 4 formed on a surface of the base film 3. Along one of the side edges of the base film 3, a straight uncoated portion 6 having a constant width is formed as a longitudinal margin 6 so as to separate the metal coating layer 4 from the terminal electrode 20 connected to the opposite metalized film 2. The first metalized film 2 is placed on the second metalized film 2 in a reverse manner, while keeping a constant distance between the longitudinal margin 6 and the side edge of the other film 2. Therefore, the terminal electrodes 20 are respectively connected to each metal coating layer 4 while preventing a short circuit between both metal coating layers 4.

Furthermore, in the metal coating layer 4, a plurality of uncoated portions 12 are formed as area partition margins 12 so as to respectively form, a plurality of electrode regions 14, a plurality of fuse connecting regions 16 surrounded by two or more of the electrode regions 14, and a plurality of fuse portions 18A–18D electrically connecting each one of the fuse connecting regions 16 with the electrode regions 14 surrounding the one of the fuse connecting regions 16.

In this embodiment, the area partition margin 12 has a shape of an "H", consisting of a relatively long linear electrode partition segment 8 and a relatively short linear fuse forming segment 10 extending perpendicularly from both ends of the electrode partition segment 8. The width of the segments 8 and 10 is not limited in the present invention, however, it is preferably in a range of 0.05–3 mm, more preferably in a range of 0.1–2 mm, and the most suitably in a range of 0.2–1.5 mm. If the width of the segments 8 and 10 is less than 0.05 mm, it becomes difficult to form the area partition margin 12. Conversely, if the width of the segments 8 and 10 is larger than 5 mm, the capacity of a condenser becomes unnecessary small.

In this embodiment, the area partition margins 12 are arranged so as to form a lattice pattern while forming gaps between them. Therefore, the electrode regions 14 and the fuse connecting regions 16 have nearly square shapes, and each of the four corners of the electrode regions 14 are electrically connected to each of the four corners of the fuse connection regions 16 via one of the fuse portions 18A–18D. The lattice pattern of this embodiment is inclined with respect to the longitudinal direction of the film 2 by 45°; however, the lattice pattern can be arranged at any angle, for example 0° with respect to the longitudinal direction of the film 2.

Figure 3:
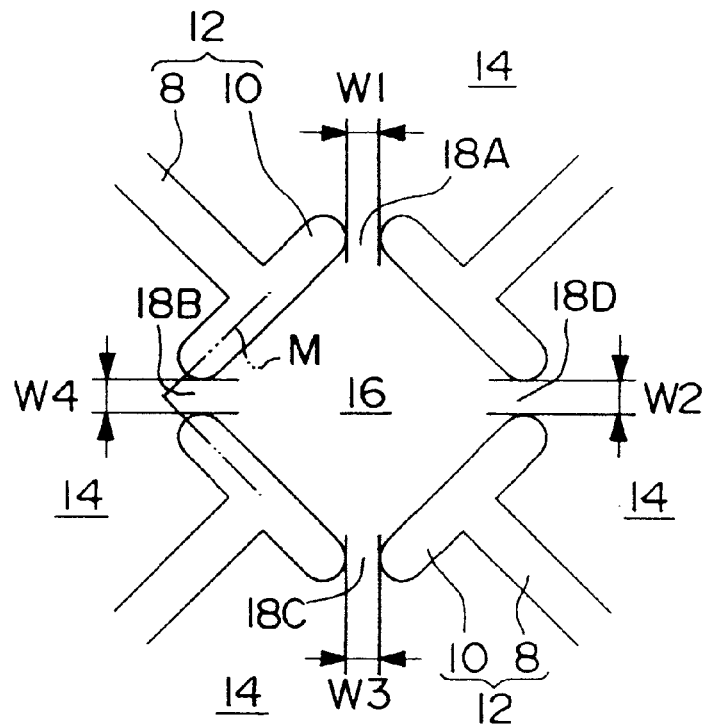
FIGS. 3–8 are enlarged plan views respectively showing fuse patterns of another embodiments of the present invention.

The length L2 of the fuse forming segments 10 is not limited in the present invention; however it is preferably in a range of 0.6–100%, and is more preferably in a range of 2.5–30%, of the length L1 of the electrode partition segments 8. If the length L2 is less than 0.6% of the length L1, it becomes difficult to prevent the fuse portions 18A–18D from synchronously fusing. Conversely, if the length L2 is longer than 100% of the length L1, the probability of occurrence of self-healing in the fuse connecting regions 16 increases. Self-healing is a phenomenon in which the metal coating of the fuse connecting regions 16 evaporates by short circuits generated therein, and such a self-healing is likely to cut the fuse portions 18A–18D. Therefore, it is preferable that the fuse connecting portion 16 be sufficiently small with regard to the electrode region 14. The area of the fuse connecting region 16 is preferably in a range of 0.004–35%, more preferably in a range 0.06–20%, of that of the electrode region 14. As shown in FIG. 3, the measurement of the area may be performed by dividing the regions along a center line M of the segments 8 and 10.

In general, the length L1 of the electrode partition segment 8 is preferably in a range of 5–50 mm, and more preferably in a range 7–20 mm, the length L2 of the fuse forming segment 10 is preferably in a range of 0.3–10 mm, and more preferably in a range 0.5–3 mm, and most preferably in a range of 0.5–2 mm. However, the present invention is not limited in these ranges.

The widths W1–W4 of the fuse portions 18A–18D is not limited in the present invention; however, they are preferably in a range of 0.05–5 mm, and more preferably in a range of 0.1–1.5 mm. The widths W1–W4 may be the same or different from each other as follows:

TABLE 1

| | |
|---|---|
| W1 = W2 > W3 = W4 | W1 = W2 < W3 = W4 |
| W1 = W3 > W2 = W4 | W1 = W3 < W2 = W4 |
| W1 > W2 = W3 = W4 | W1 = W2 = W3 > W4 |
| W1 < W2 = W3 = W4 | W1 = W2 = W3 < W4 |

TABLE 1-continued

| W1 < W2 < W3 < W4 | W1 > W2 > W3 > W4 |
|---|---|
| W2 < W1 < W4 < W3 | W2 > W1 > W4 > W3 |

The maximum width of the fuse portions 18A–18D is preferably 1.5–10 times, more preferably 1.5–5 times, and most preferably 2–3 times as large as the minimum width thereof.

In the case where at least one of the widths W1–W4 is different from the others, when one of the four fuse portions 18A–18D cuts off and heavy current flows in the remaining three fuse portions, the risk that all the remaining fuse portions cut off at the same time can be reduced, and unnecessary decrease in the capacity of the film condenser can thereby be reduced. However, even in the case where the widths W1–W4 are the same, it is possible to prevent unnecessary breakdown of the neighboring fuse portions due to thermal impact by evaporation of one fuse portion.

Figure 4:
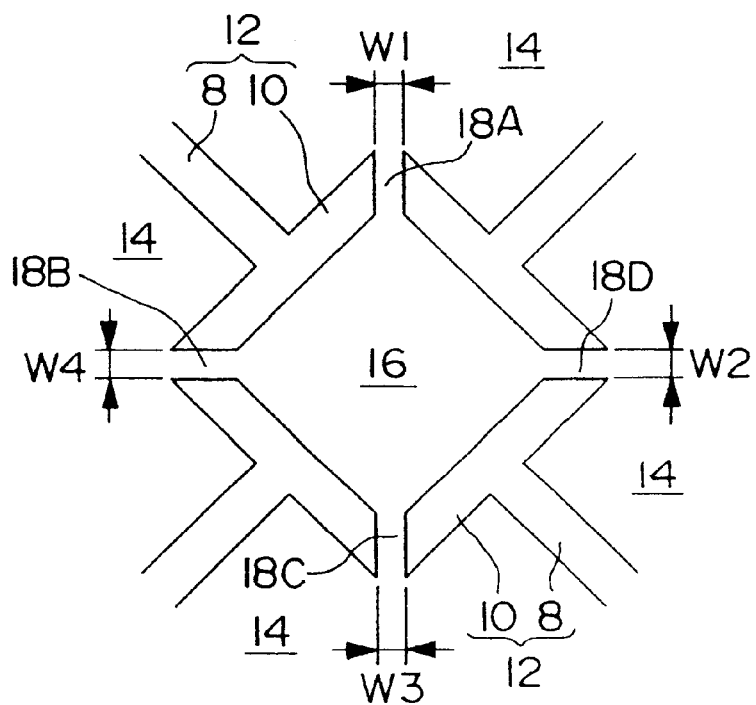

In this embodiment, as shown in FIG. 3, both ends of the fuse forming segments 10 have a semicircular shape, and the fuse portions 18A–18D have a shape narrowed at the center thereof. However, the present invention is not limited to this; for example, both ends of the fuse forming segments 10 may have a square shape as shown in FIG. 4.

The material of the base film 3 is not limited in the present invention; however, it is preferably one or two or more selected from the group consisting of polyethylene terephthalate, polypropylene, polystyrene, polycarbonate, polytetrafluoroethylene, and polyethylene. The base film 3 may be a multiple layer consisting of two or more of the above materials.

The material of the metal coating layer 4 is preferably one or two or more selected from the group consisting of aluminum, zinc, copper, and alloys of these metals. However, the present invention is not limited to use of only these metals.

The metalized film 2 can be manufactured by various methods. A first method comprises the steps of applying masking oil on a surface of a plastic film so as to form a pattern consisting of the area partition margins 12 and the longitudinal margin 6, and forming a metal coating on the surface of the plastic film by means of vacuum deposition. The plastic film may have a width several times as large as that of the base film 3; in this case, the plastic film is cut after the deposition of the metal coating. The masking oil is preferably fluorine compounds such as perfluroalkylpolyether, and prevents metal deposition on the plastic film.

A second method for manufacturing the metalized film 2 comprises the steps of uniformly forming a metal coating on a surface of a plastic film by means of vacuum deposition, and forming the uncoated portions 6 and 12 in the metal coating by locally irradiating the metal coating with thin laser beams while scanning.

According to the film condenser 1 and the metalized film 2 of this embodiment, because four neighboring fuse portions 18A–18D are connected to each other via the fuse connecting region 16 having a larger area than those of the fuse portions 18A–18D, it is possible to thermally isolate the neighboring fuse portions 18A–18D from each other. Therefore, when one of the fuse portions 18A–18D evaporates due to the short circuit, it is possible to prevent the neighboring fuse portions from breaking down due to the heat impact generated by the evaporation. Thus, the decrease of capacitance of the film condenser 1 can be reduced while obtaining an appropriate fuse function.

Furthermore, because the area of the fuse connecting portion 16 is smaller than that of the electrode region 14, the risk that a current impact is applied to the fuse connecting portions 16 is small. Therefore, it is possible to prevent that all four fuse portions 18A–18D from breaking down at the same time due to a current impact such as a corona discharge occurring in the fuse connecting portion 16.

In comparison with this, in the film condenser disclosed in Japanese Patent Application, First Publication, No. Hei 4-225508, because a plurality of fuse portions are integrated in a small area, these fuse portions are likely to break down at the same time when one of them evaporates due to heavy current.

[SECOND EMBODIMENT]

Figure 2:
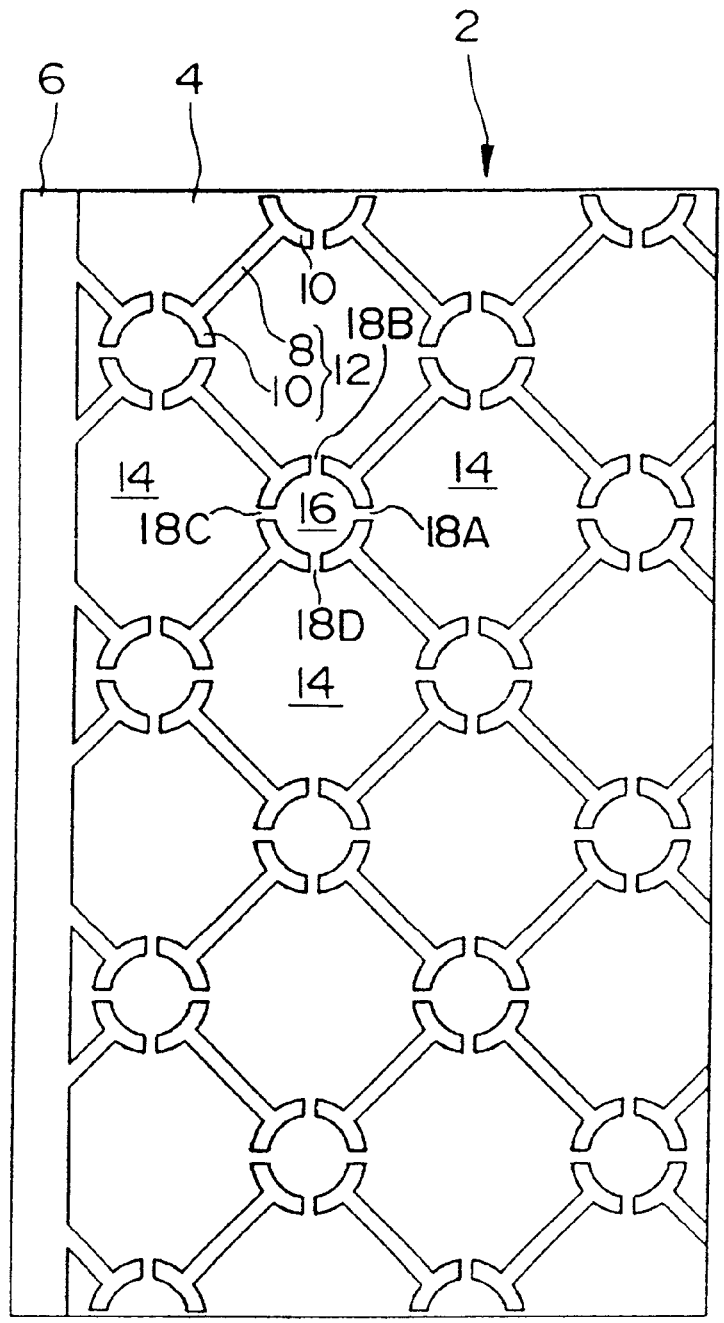
FIG. 2 is a plan view showing a metalized film according to another embodiment of the present invention.

FIG. 2 shows a metalized film 2 according to the second embodiment of the present invention. In this embodiment, the fuse forming segments 10 have an arc shape, and the neighboring four fuse forming segments 10 are arranged so as to form a circle. In this embodiment, both ends of each fuse forming segment 10 have a square shape, and the fuse portion has a rectangular shape. However, both ends of each fuse forming segment 10 may have another shape, for example, a semicircular shape (see FIG. 3) or a triangular shape. The other constructions of the second embodiment may be the same as those of the first embodiment. The width of the fuse portions 18 may be different from each other as described in the first embodiment.

[THIRD TO FIFTH EMBODIMENTS]

Figure 5:
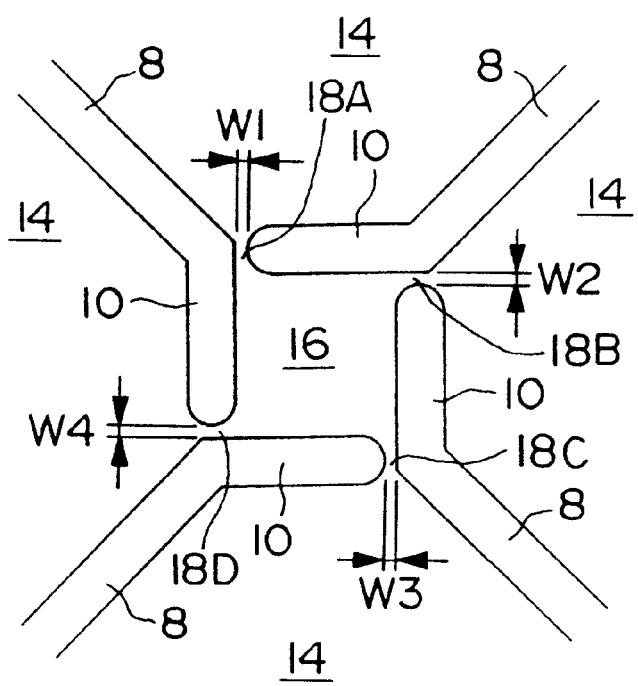
Figure 6:
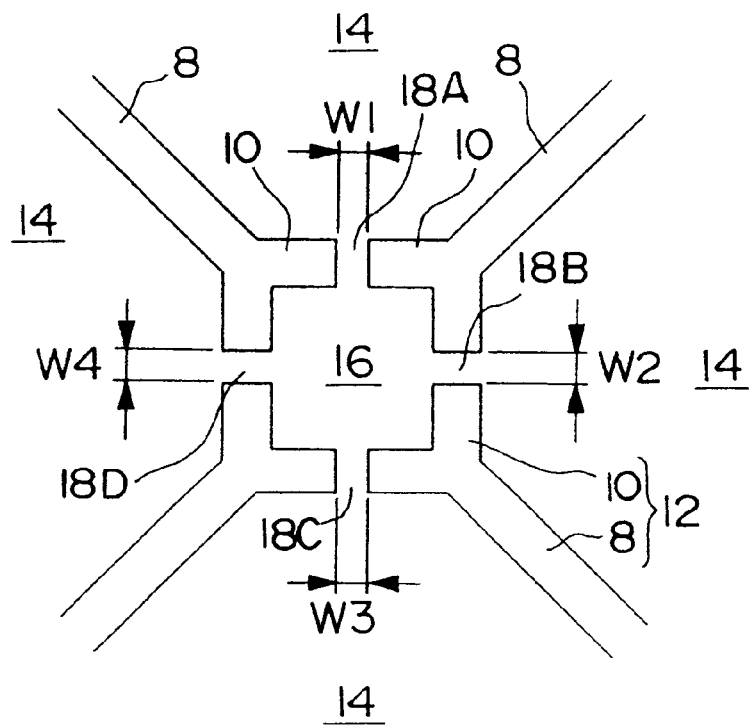
Figure 7:
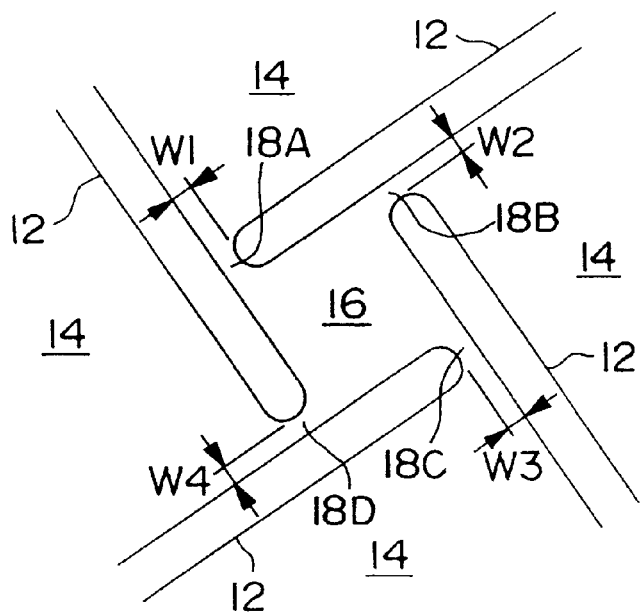

The area partition margins 12 may have the shapes respectively shown in FIGS. 5–7. In the third embodiment shown in FIG. 5, each fuse forming segment 10 is formed as a linear line inclined at 45° with regard to the electrode partition segment 8, and the end of the fuse forming segment 10 has a semicircular shape. The other constructions of this embodiment may be the same as those of the first embodiment.

In the fourth embodiment shown in FIG. 6, each fuse forming segment 10 has a shape of a "Y", and the end of the fuse forming segment 10 has a rectangular shape. The other constructions of this embodiment may be the same as those of the first embodiment.

In the fifth embodiment shown in FIG. 7, the area partition margin 12 is a simple straight line. The area partition margins 12 are arranged so as that the ends of the neighboring four margins 12 surround a fuse connecting region 16. The other constructions of this embodiment may be the same as those of the first embodiment.

[SIXTH EMBODIMENT]

Figure 8:
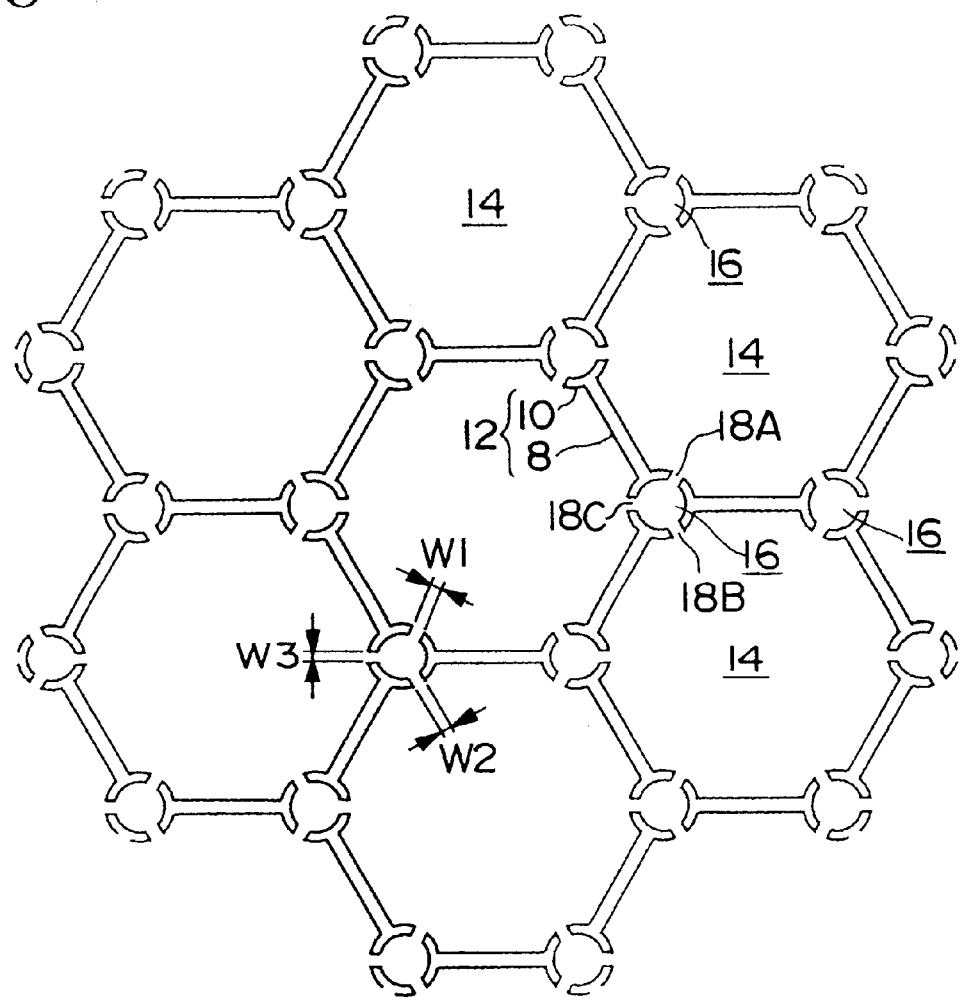

In the sixth embodiment shown in FIG. 8, the area partition margins 12 are arranged to form a honeycomb pattern, and the electrode regions 14 have a hexagonal shape. The shape of the fuse forming segment 10 may be the same as those shown in FIGS. 3–7. The other constructions of this embodiment may be the same as those of the first embodiment. The widths W1–W3 of the fuse portions 18 may be different from each other.

[SEVENTH EMBODIMENT]

Figure 9:
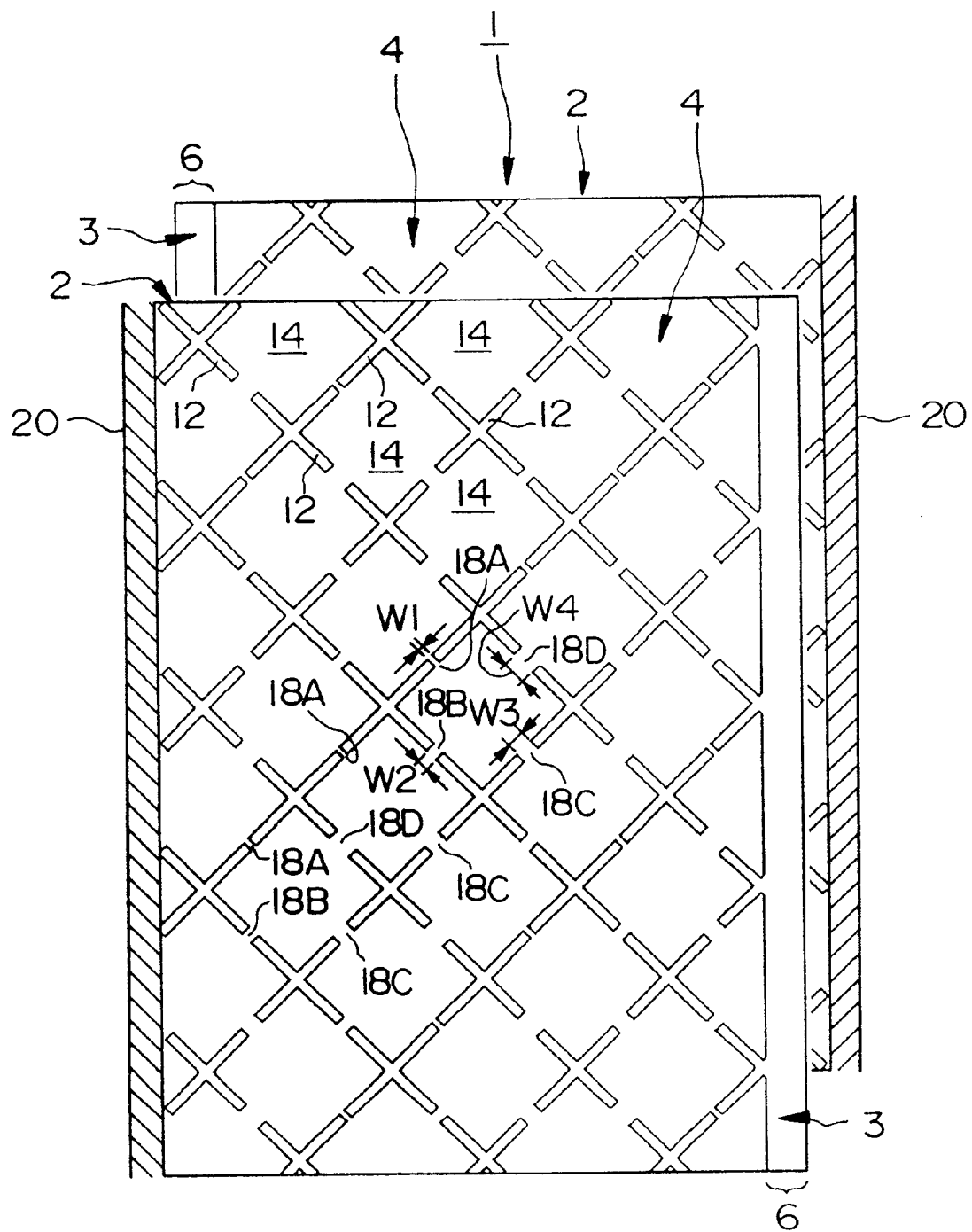
FIGS. 9–17 are developments respectively showing metalized films and a film condenser according to another embodiment of the present invention.
Figure 10:
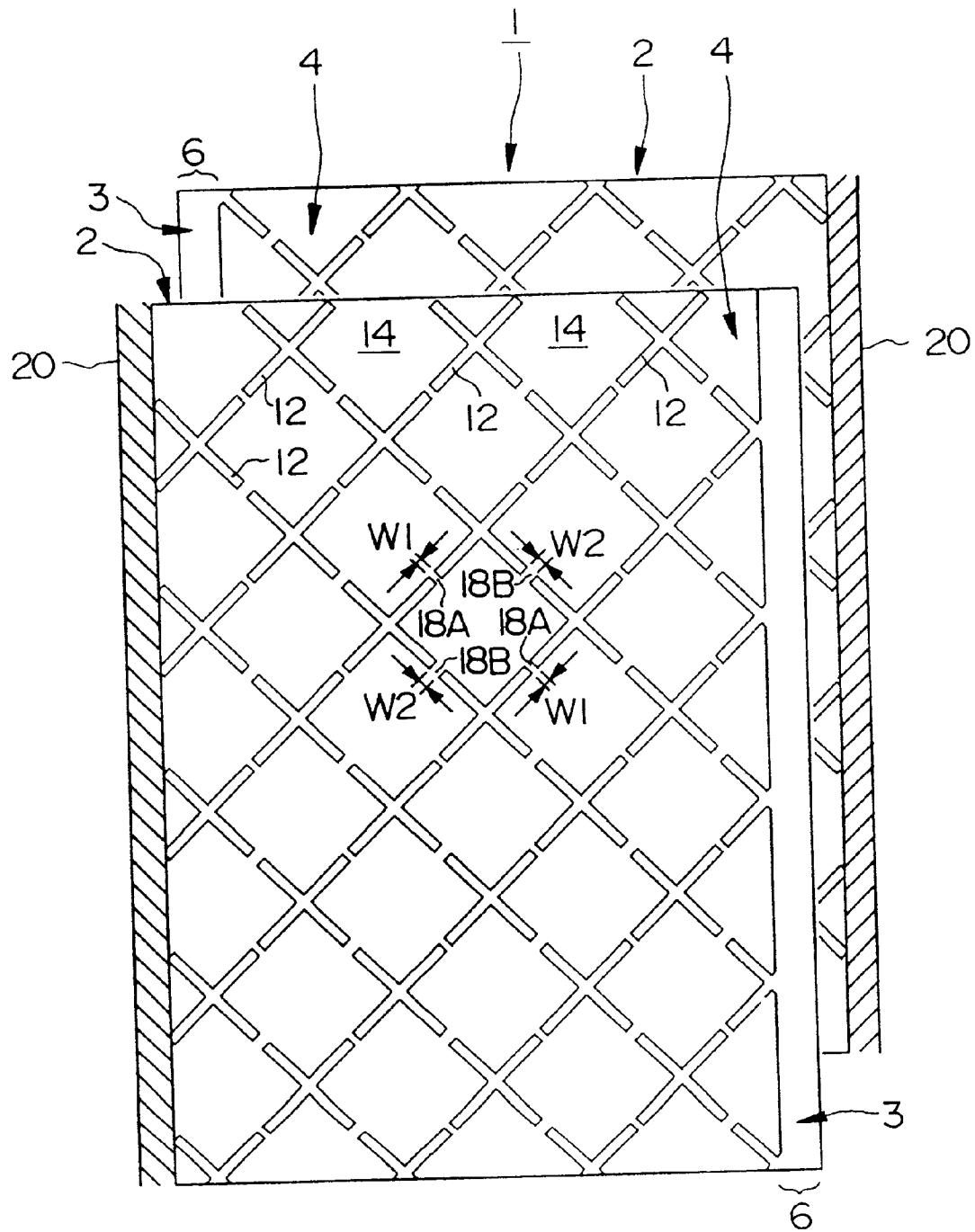

FIG. 9 shows a seventh embodiment according to the present invention. In this embodiment, the area partition margins 12 have a shape of a cross, and the margins 12 are arranged to form a lattice pattern angled with respect to the longitudinal direction of the metalized film 2 while forming fuse portions 18A–18D between them. Each electrode region 14 is electrically connected respectively to the neighboring four electrode regions 14 via four fuse portions 18A–18D, and at least one of the widths W1–W4 of four fuse portions 18A–18D is different from the others as listed in Table 1. In particular, the embodiment shown in FIG. 9 satisfies the relation of W1<W2<W3<W4. In contrast, FIG. 10 shows a modification of the seventh embodiment which comprises two types of fuse portions 18A and 18B, and satisfies the relation of W1<W2.

This embodiment does not comprise fuse connecting regions (16). The other constructions of this embodiment may be the same as those of the first embodiment.

In the seventh embodiment, because selected ones of the fuse portions 18A–18D have a different fusing current from that of others of the fuse portions, when a corona discharge occurs in one of the electrode regions 14, only the neighboring fuse portion(s) having a lower fusing current will break down while the neighboring fuse portions having a higher fusing current remain uncut. Therefore, it is possible to reduce the unnecessary incapacitation of the electrode regions 14 which may occur when a corona discharge occurs, it is thereby possible to restrain the decrease of the capacitance of the film condenser 1.

[EIGHTH EMBODIMENT]

Figure 11:
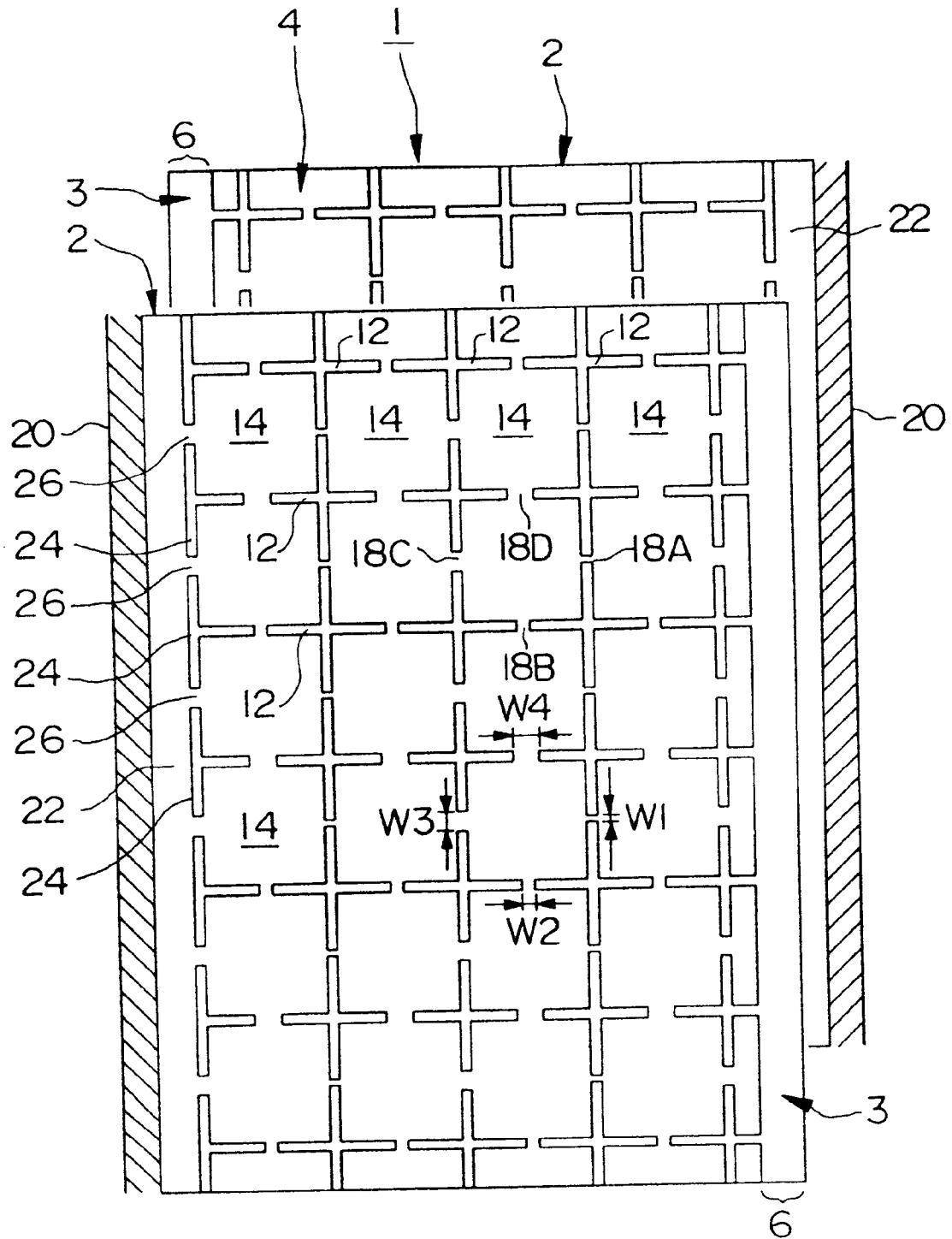

FIG. 11 shows an eighth embodiment in which the area partition margins 12 having a shape of a cross are arranged to form a lattice pattern being parallel (or perpendicular) with the longitudinal direction of the metalized film 2. Furthermore, in this embodiment, a plurality of second uncoated portions 24 are formed as terminal partition margins 24 in the metal coating layer 4 so as to respectively form a terminal region 22 extending along an edge of the base film 3, and second fuse portions 26 electrically connecting the terminal region 22 and the electrode regions 14. The terminal region 22 is electrically connected to the terminal electrode 20 which is formed on a side end of the metalized film 2. The other constructions of this embodiment may be the same as those of the seventh embodiment.

According to the eighth embodiment, because the second fuse portions 26 are formed, it is possible to obtain the fuse function even when a short circuit occurs in a region being adjacent to the terminal region 22.

[NINTH EMBODIMENT]

Figure 12:
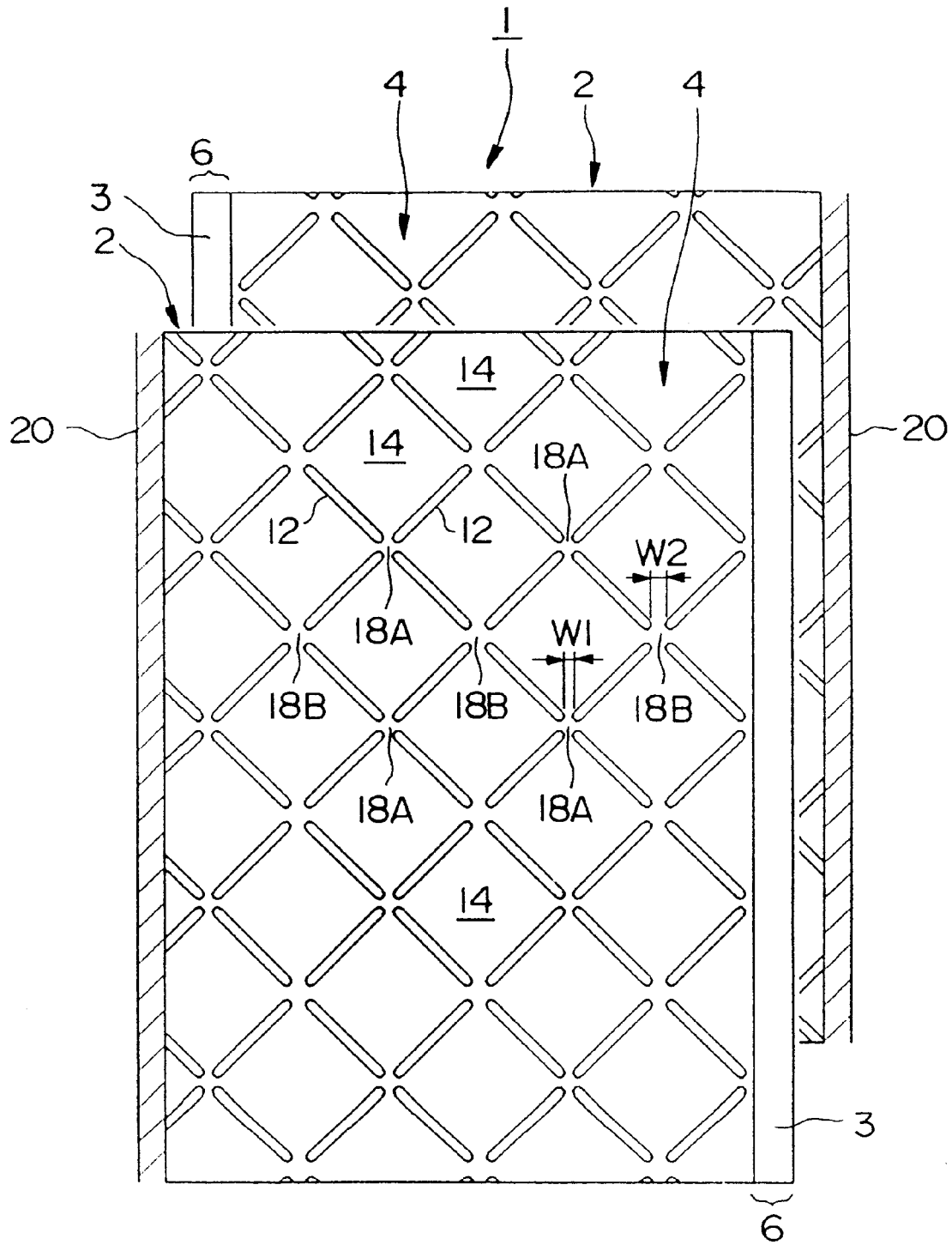

In the ninth embodiment shown in FIG. 12, the area partition margins 12 have a shape of a straight line, and they are arranged to form a lattice pattern. Thin fuse portions 18A and broad fuse portions 18B are formed between the area partition margins 12, and each electrode region 14 is electrically connected to the neighboring eight electrode regions 14 via two thin fuse portions 18A and two broad fuse portions 18B.

In this embodiment, because the thin fuse portions 18A have a smaller fusing current than those of the broad fuse portions 18B, when a corona discharge occurs in one of the electrode regions 14, only the thin fuse portions 18A will be break down while the broad fuse portions 18B remain uncut. Therefore, it is possible to reduce the unnecessary incapacitation of the electrode regions 14 due to a corona discharge, it is thereby possible to restrain the decrease of the capacitance of the film condenser 1.

[TENTH TO FOURTEENTH EMBODIMENTS]

FIGS. 13–17 respectively show the tenth to the fourteenth embodiments of the present invention. These embodiments are characterized in that a plurality of terminal partition margins 24 are formed in the metal coating layer 4 so as to respectively form a terminal region 22 extending along an edge of the base film 3, and second fuse portions 26 electrically connecting the terminal region 22 and the electrode regions 14. The terminal region 22 is electrically connected to the terminal electrode 20 which are formed on both side ends of the metalized film 2. The other constructions of these embodiment may be the same as those of the previous embodiments. The width of the second fuse portions 26 and the terminal partition margins 24 may be in the same range as those of the first fuse portions 18 and the area partition margins 12. In these embodiments, the width of the first fuse portions 18 may be the same as each other, or they may be different from each other.

Figure 13:
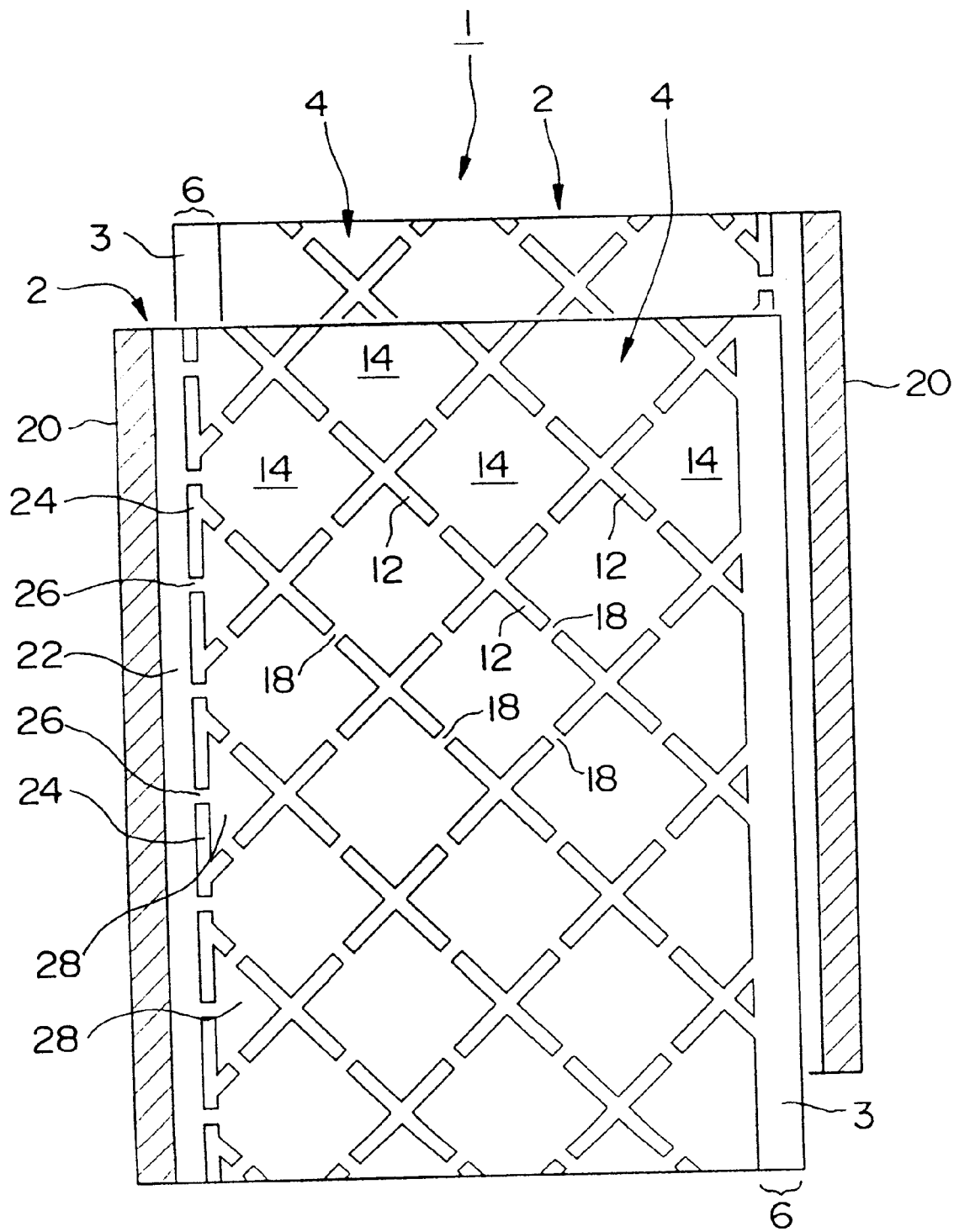
Figure 14:
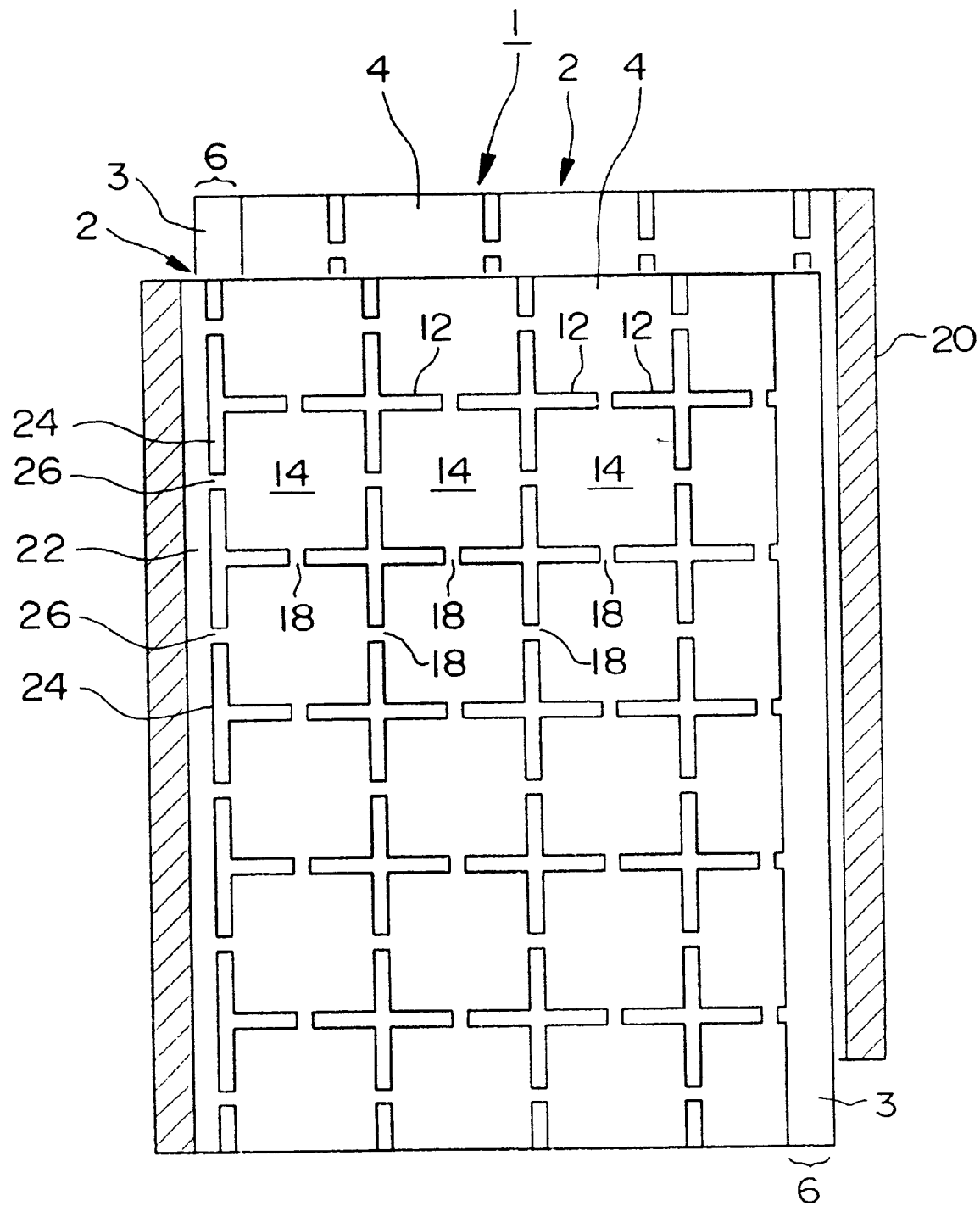
Figure 15:
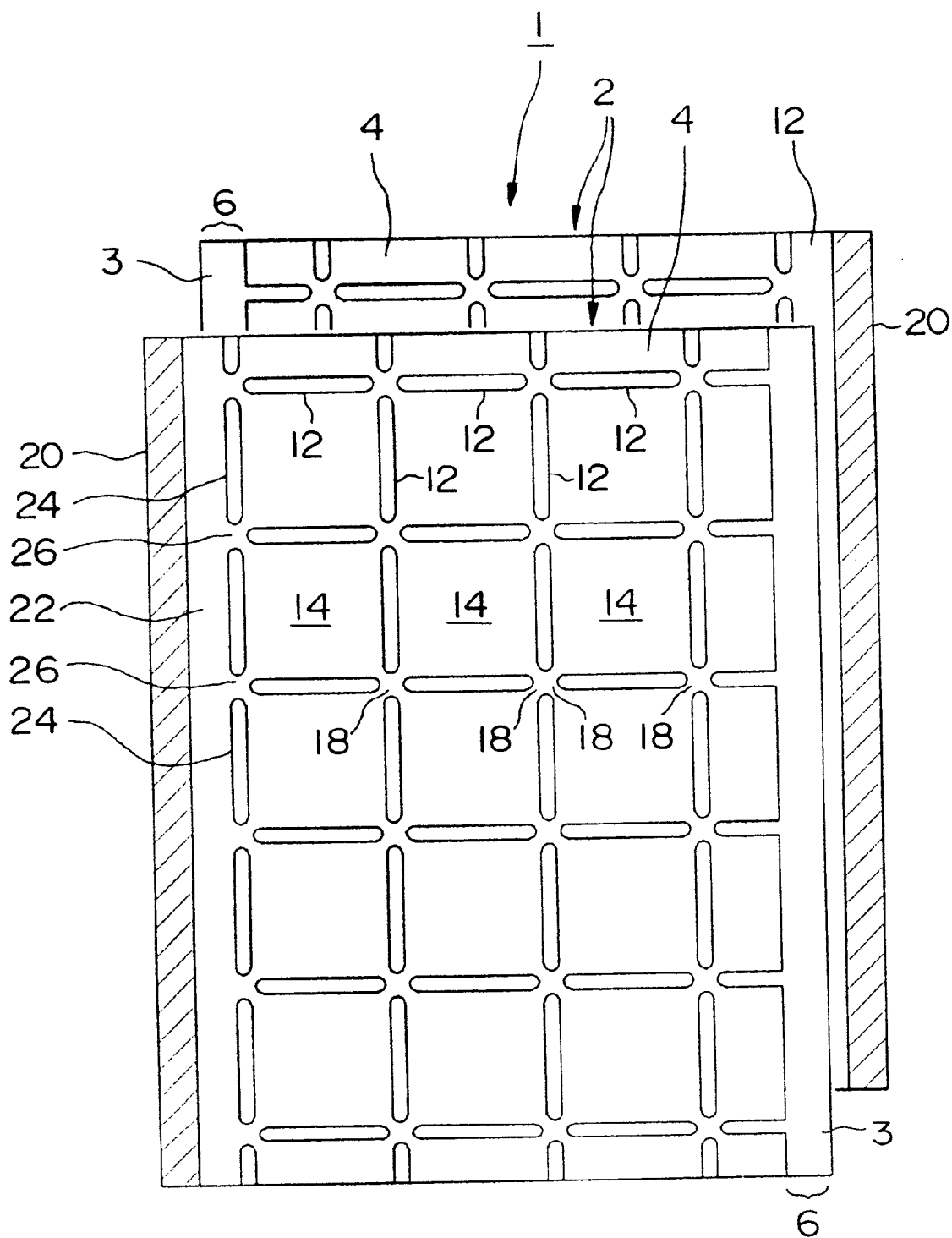
Figure 16:
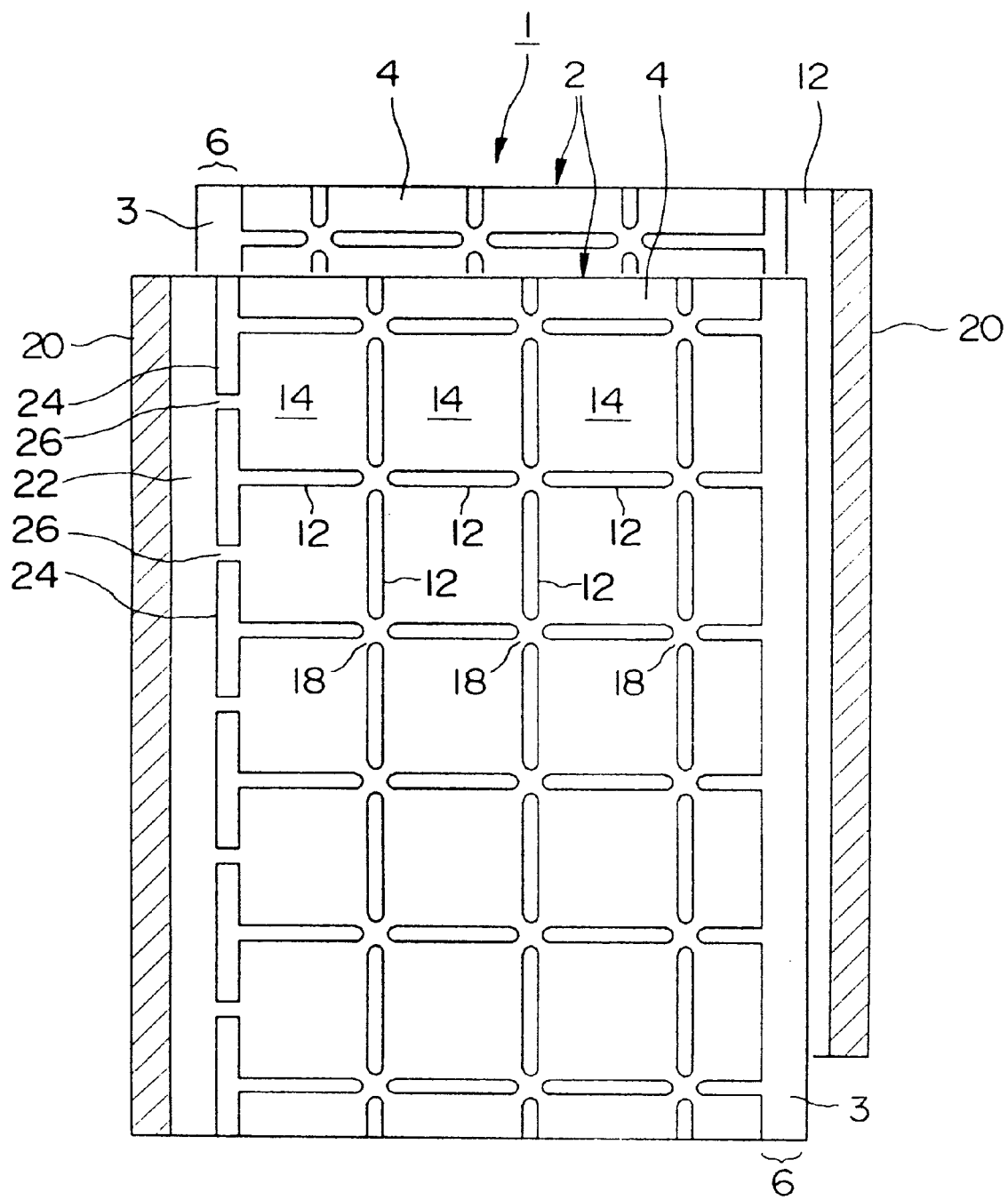
Figure 17:
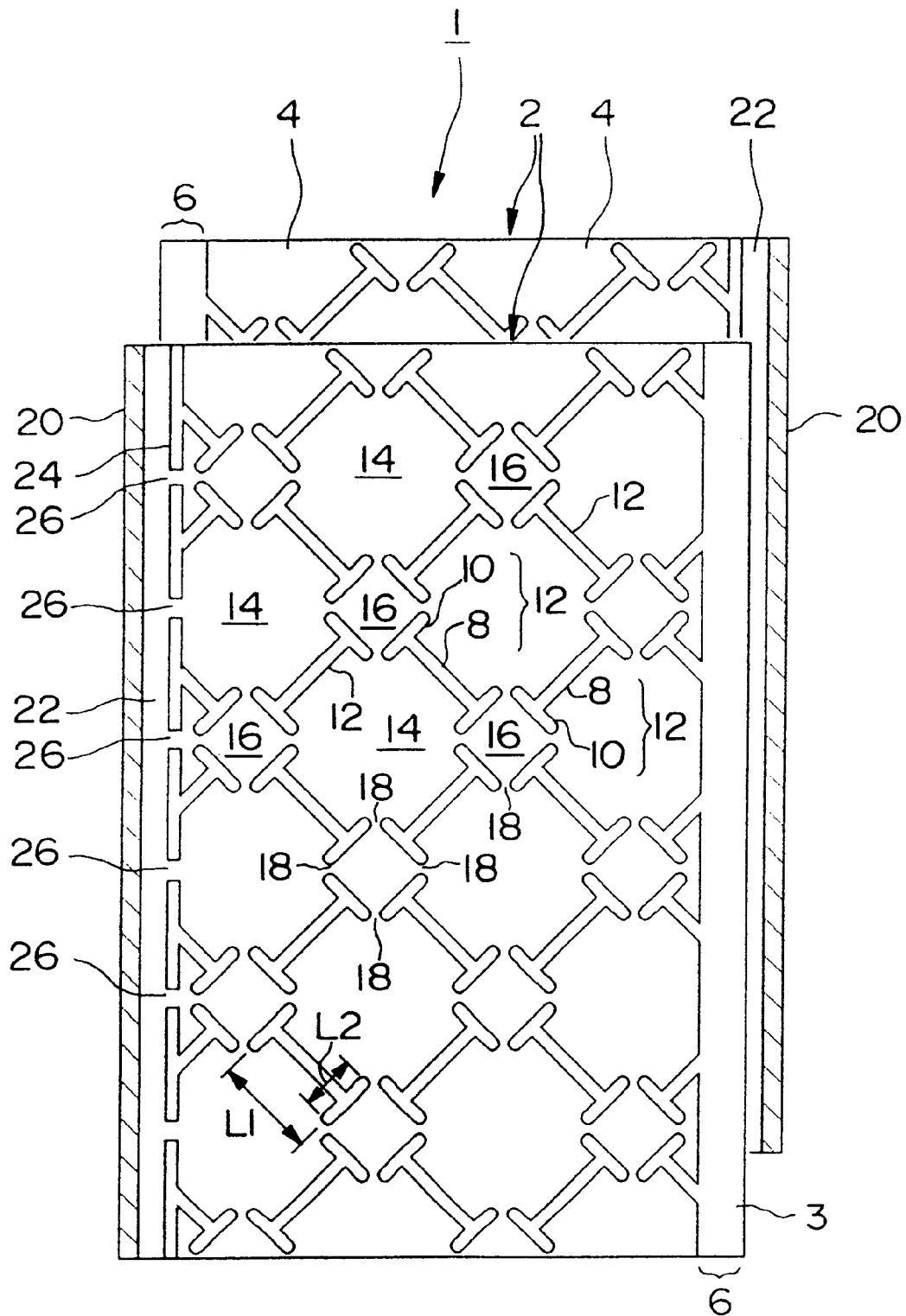

According to these embodiments, because the second fuse portions 26 are formed, it is possible to obtain the fuse function even when a short circuit occurs in a region being adjacent to the terminal region 22, for example, in region 28 shown in FIG. 13.

What is claimed is:

1. A metalized film comprising a base film formed from an insulating material, and a metal coating layer formed on said base film, wherein a plurality of uncoated portions are formed as area partition margins in said metal coating layer so as to respectively form, in said metal coating layer, a plurality of electrode regions, a plurality of fuse connecting regions surrounded by two or more of said electrode regions, and a plurality of fuse portions electrically connecting each one of said fuse connecting regions with said electrode regions surrounding said one of said fuse connecting regions, and wherein each of said fuse connecting regions has an area which is smaller than that of each of said electrode regions.

2. The metalized film according to claim 1, wherein each of said fuse connecting regions has an area of 0.1–100 mm$^2$.

3. The metalized film according to claim 1, wherein each of said electrode regions are substantially quadrilateral, and four fuse portions are connected to four corners of each of said electrode regions.

4. The metalized film according to claim 1, wherein each of said electrode regions are substantially hexagonal, and six fuse portions are connected to six corners of each of said electrode regions.

5. The metalized film according to claim 1, wherein each of said fuse portions has a width of 0.05–5 mm.

6. The metalized film according to claim 1, wherein a selected part of said fuse portions connected to each of said fuse connecting regions has a width which is larger than that of the other part of said fuse portions connected to the same fuse connecting region.

7. A metalized film comprising a base film formed from an insulating material, and a metal coating layer formed on said base film, wherein a plurality of uncoated portions are formed as area partition margins in said metal coating layer so as to respectively form, in said metal coating layer, a plurality of electrode regions and a plurality of fuse portions electrically connecting neighboring ones of said electrode regions, wherein selected ones of said fuse portions connected to each of said electrode regions have a width which is larger than that of the other ones of said fuse portions connected to the same electrode region.

8. The metalized film according to claim 7, wherein said selected ones of said fuse portions have a fusing current which is greater than that of said other ones of said fuse portions connected to the same electrode region.

9. The metalized film according to claim 7, wherein each of said fuse portions has a width of 0.05–5 mm, and the width of said selected ones of said fuse portions is 1.5–10 times as large as that of said other ones of said fuse portions connected to the same electrode region.

10. A metalized film comprising a base film formed from an insulating material, and a metal coating layer formed on said base film, wherein a plurality of first uncoated portions are formed as electrode partition margins in said metal coating layer so as to respectively form, in said metal coating layer, a plurality of electrode regions and a plurality of first fuse portions electrically connecting neighboring ones of said electrode regions, furthermore, wherein a plurality of linear second uncoated portions are formed as terminal partition margins in said metal coating layer parallel with an edge of said base film so as to respectively form, in said metal coating layer, an electroconductive terminal region extending along said edge of said base film, and second fuse portions electrically connect said terminal region and said electrode regions adjoining said terminal region.

11. A film condenser comprising first and second metalized films which are stacked up to each other, wherein said first metalized film comprises a base film formed from an insulating material and a metal coating layer formed on said base film, wherein a plurality of uncoated portions are formed as area partition margins in said metal coating layer so as to respectively form, in said metal coating layer, a plurality of electrode regions, a plurality of fuse connecting regions surrounded by two or more of said electrode regions, and a plurality of fuse portions electrically connecting each one of said fuse connecting regions with said electrode regions surrounding said one of said fuse connecting regions, and wherein each of said fuse connecting regions has an area which is smaller than that of said electrode regions.

12. A film condenser comprising first and second metalized films which are stacked up to each other, wherein said first metalized film comprises a base film formed from an insulating material, and a metal coating layer formed on said base film, wherein a plurality of uncoated portions are formed as area partition margins in said metal coating layer so as to respectively form, in said metal coating layer, a plurality of electrode regions and a plurality of fuse portions electrically connecting neighboring ones of said electrode regions, wherein selected ones of said fuse portions connected to each of said electrode regions have a width which is larger than that of the other of said fuse portions connected to the same electrode region.

13. A film condenser comprising first and second metalized films which are stacked up to each other, wherein said first metalized film comprises a base film formed from an insulating material, and a metal coating layer formed on said base film, wherein a plurality of first uncoated portions are formed as electrode partition margins in said metal coating layer so as to respectively form, in said metal coating layer, a plurality of electrode regions and a plurality of first fuse portions electrically connecting neighboring ones of said electrode regions, furthermore, wherein a plurality of linear second uncoated portions are formed as terminal partition margins in said metal coating layer parallel with an edge of said base film so as to respectively form, in said metal coating layer, an electroconductive terminal region extending along said edge of said base film, and second fuse portions electrically connect said terminal region and said electrode regions adjoining said terminal region.

* * * * *